(12) United States Patent
Wrathall

(10) Patent No.: US 8,482,270 B2
(45) Date of Patent: Jul. 9, 2013

(54) REVERSE CURRENT COMPARATOR FOR SWITCHING REGULATORS

(75) Inventor: Robert Stephen Wrathall, Scotts Valley, CA (US)

(73) Assignee: Advanced Analogic Technologies Incorporated, Santa Clara, CA (US)

( * ) Notice: Subject to any disclaimer, the term of this patent is extended or adjusted under 35 U.S.C. 154(b) by 0 days.

(21) Appl. No.: 11/381,304

(22) Filed: May 2, 2006

(65) Prior Publication Data

US 2007/0257651 A1 Nov. 8, 2007

(51) Int. Cl.
G05F 1/575 (2006.01)
G05F 1/656 (2006.01)

(52) U.S. Cl.
USPC .......................................... 323/284; 323/285

(58) Field of Classification Search
USPC ................................ 323/22, 224, 282, 284, 285
See application file for complete search history.

(56) References Cited

U.S. PATENT DOCUMENTS

| 6,307,356 | B1* | 10/2001 | Dwelley .......................... 323/282 |
| 6,396,252 | B1* | 5/2002 | Culpepper et al. ............. 323/285 |
| 6,437,549 | B1* | 8/2002 | Takagishi ....................... 323/282 |
| 6,541,947 | B1* | 4/2003 | Dittmer et al. ................. 323/284 |
| 7,072,198 | B2* | 7/2006 | Krug et al. ..................... 363/127 |

\* cited by examiner

Primary Examiner — Gary L Laxton

(57) ABSTRACT

A reverse current comparator for use in switching regulators includes a differential stage configured to encode the difference in voltage between an N and a P input. The differential stage feeds one or more gain stages. At least one of the gain stages includes one or more hysteresis devices. When the voltage of the N input exceeds the voltage of the P input by a predetermined margin, the hysteresis device causes the regulator to enter a triggered state in which it outputs a non-zero output voltage. Subsequent changes to the N and P inputs do not change the regulator output until a RESET input is asserted and which point the regulator enters a reset state and is ready to be triggered.

16 Claims, 4 Drawing Sheets

REVERSE CURRENT COMPARATOR FOR SWITCHING REGULATORS

BACKGROUND OF INVENTION

Switching regulators are intended to be efficient machines for converting an input voltage to an output voltage. The two most common types of switching regulators are Boost (voltage increasing converters) and Buck (voltage decreasing regulators). Both Boost and Buck regulators are very important for battery powered applications such as cellphones.

As shown in FIG. 1A, a traditional implementation for a Boost regulator includes an inductor L connected between an input voltage (VBATT in this case) and a node VX. A switch M1 is connected is connected between the node VX and ground. A diode D is connected between VX and the output node (VOUT) of the regulator. A filtering capacitor connects VOUT to ground. A control circuit turns switch M1 on and off in a repeating pattern. This causes the Boost regulator to have two distinct operational phases. In the first phase, shown in FIG. 1B, the switch M1 is on. During this phase, called the charging phase, the inductor is connected between the battery and ground. This causes the inductor L to store energy in the form of a magnetic field.

In the second, or discharge phase the switch M1 is opened (see FIG. 1C). In this phase the battery, inductor and diode are connected in series with the load. As a result, current flows to the load as the magnetic field previously stored by the inductor collapses. The series connection of the battery and inductor means that current is delivered at greater than battery voltage. As the inductor's magnetic field collapses and the voltage over the inductor falls, the diode prevents current at the load from actually reversing.

The regulator architecture just illustrated suffers one fundamental flaw: the diode D has, by nature a forward voltage drop. Depending on the type of diode, this can be fairly small, but is still generally unacceptable for low voltage applications. For this reason, it is common to replace the diode D with a second switch M2. FIG. 2A and 2B show Boost and Buck regulators of this type, respectively.

The basic idea is that the switch M2 operates with no voltage drop (when switched on) overcoming the disadvantages inherent in diode based designs. Regulators of this type are often referred to as "synchronous regulators" because the two switches are driven synchronously—when one is on, the other is off. In the real world, this is never quite the case. It takes time to turn the switches on and off and control cannot be done with absolute precision. For this reason, the act of turning a switch off is always done slightly in advance of the act of turning the other switch on. This technique, known as break-before-make or BBM avoids the situation where both switches are on at the same time and power is connected to ground (a condition known as shoot through).

In general, switching regulators work in environments where both the input and output voltage are dynamic. Input voltages change as battery voltages decline over time or as other components draw more power. Output voltages change depending on load requirements. Switching regulators react to changes in input and output voltages by varying the amount of time that the switches M1 and M2 remain on. This is done using two different methods. In the first method, the switching frequency is varied—as the load on the regulator increases (relative to its supply) the switching frequency is increased. This is known as pulse frequency modulation or PFM. In the second method a fixed switching frequency is used and the amount of time that the switches M1 and M2 are turned on is varied. For larger loads, the switches stay on longer. This is known as pulse width modulation of PWM. Of the two methods, PWM is often preferred because it produces noise at a known and therefore filterable fixed frequency. Filtering the noise created by a PFM converter can be problematic—especially in portable applications.

Switching regulator operation may be "continuous" or "discontinuous." In continuous operation no allowance is made for reverse current flowing backwards from the output to the input. This mode suffers losses due to the ripple reverse current flowing in the inductor, which can be rather high for small inductors and higher voltages. This loss becomes more noticeable at lower output current.

One technique for reducing this type of loss is to use a comparator to sense the current in one of the switches (the high-side switch for boost converters and the low-side switch for buck converters) and turn off that switch when the current starts to flow backwards (i.e., from the load to the regulator). This reduces the ripple losses and reduces ripple current at light loads.

There is another benefit to the reverse current comparator: it means that no matter how hard one may try, there is always a small current emerging from the regulator because there is a minimum on-time required in a current mode regulator operating in normal mode. In a no-load condition this small current will continue to increase the voltage on the output capacitor until an overvoltage condition is sensed. At that point, various power saving strategies may be invoked. For one of these the regulator is turned off and put to sleep until the output voltage falls within regulation. This strategy is often used with PFM type converters and results in what is called "burst mode" characterized by periods in which the regulator switches rapidly separated by idle periods of varying duration. PWM converters can implement another power saving strategy by deciding at the beginning of each switching cycle whether output voltage is in regulation. If an overvoltage condition exists, the entire switching cycle can be skipped. This strategy, known as "pulse skipping" is characterized by constant frequency switching periods separated by idle times that last for some multiple of the basic PWM cycle. Regulators can also switch between PWM for normal operation and PFM for light load operation.

In addition to preventing current from flowing from the load to the regulator, the reverse current comparator may be used to detect light load conditions and allow the regulator to adopt a light load strategy. In practice, there are two main requirements for this comparator, that it be fast and accurate. In addition, is should consume little current. Typically the comparator is measuring millivolts in a nanosecond environment. This is very difficult to do, normally because of the competing requirements of speed and accuracy. For this reason, there is a need in the prior art for improved comparator designs.

SUMMARY OF THE INVENTION

The present invention includes a synchronous switching regulator with an improved reverse current comparator. For a typical implementation, a boost regulator includes an inductor connected between an input voltage (typically a battery) and a node $V_x$. A low-side switch is connected between the node $V_x$ and ground. A high-side switch is connected between $V_x$ and an output node ($V_{OUT}$) of the regulator. A filtering capacitor connects $V_{OUT}$ to ground. A reverse current comparator is connected to monitor the polarity over the high-side switch. The reverse current comparator turns the high-side switch off to stop current from flowing from the load to the regulator.

A control circuit turns the high and low-side switches on and off in a repeating pattern. The control circuit may be implemented to operate in PWM or PFM modes or any mixture or hybrid of PWM and PFM modes. The switches are driven out of phase—when one is on, the other is off. A comparator is used to disable the high-side switch to prevent current from flowing out of the load and into the regulator. The comparator uses a large amount of hysteresis to speed up its comparison process. The amount of hysteresis cannot be overcome by normal voltages on the input nodes of the comparator. For this reason, the comparator includes a RESET input. This input is activated during the time when the low-side switch is on and causes the comparator to wake up and reset (i.e., set to a reset condition). The comparator is then prepared for use as the low-side switch is turned off and the high-side switch turn on.

The same idea is adaptable to buck converters where the comparator is configured to disable the low-side switch to prevent reverse current flow. In converters of this type, the comparator is reset during the time that the high-side switch is on.

DESCRIPTION OF INVENTION

Figure 1A:
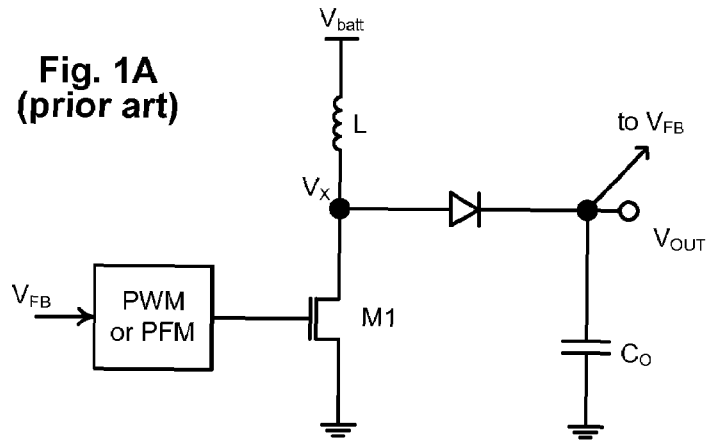
FIG. 1A is a block diagram of a boost switching regulator.
Figure 1B:
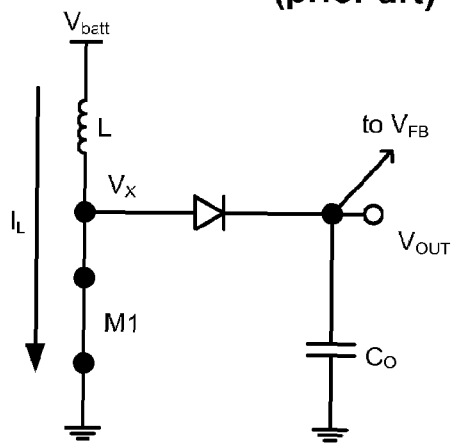
FIG. 1B is a block diagram showing the boost switching regulator of FIG. 1 during the charge phase of operation.
Figure 1C:
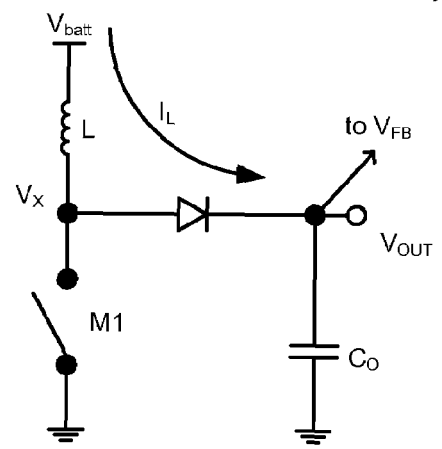
FIG. 1C is a block diagram showing the boost switching regulator of FIG. 1 during the discharge phase of operation.
Figure 2A:
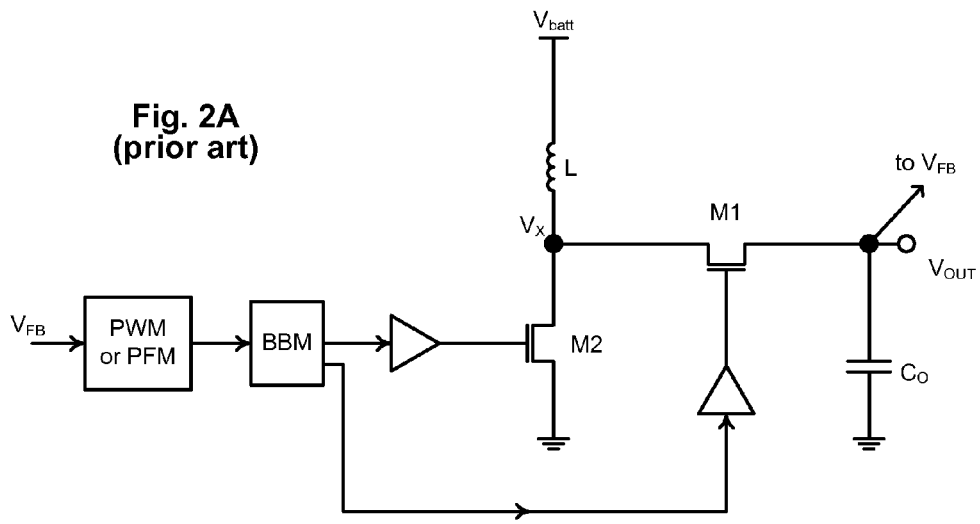
FIG. 2A is a block diagram of a buck type synchronous switching regulator.
Figure 2B:
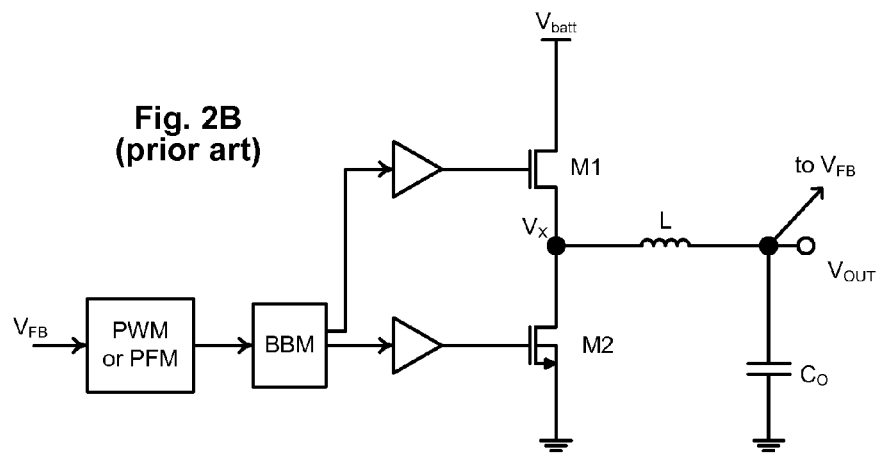
FIG. 2B is a block diagram of a boost type synchronous switching regulator.
Figure 3:
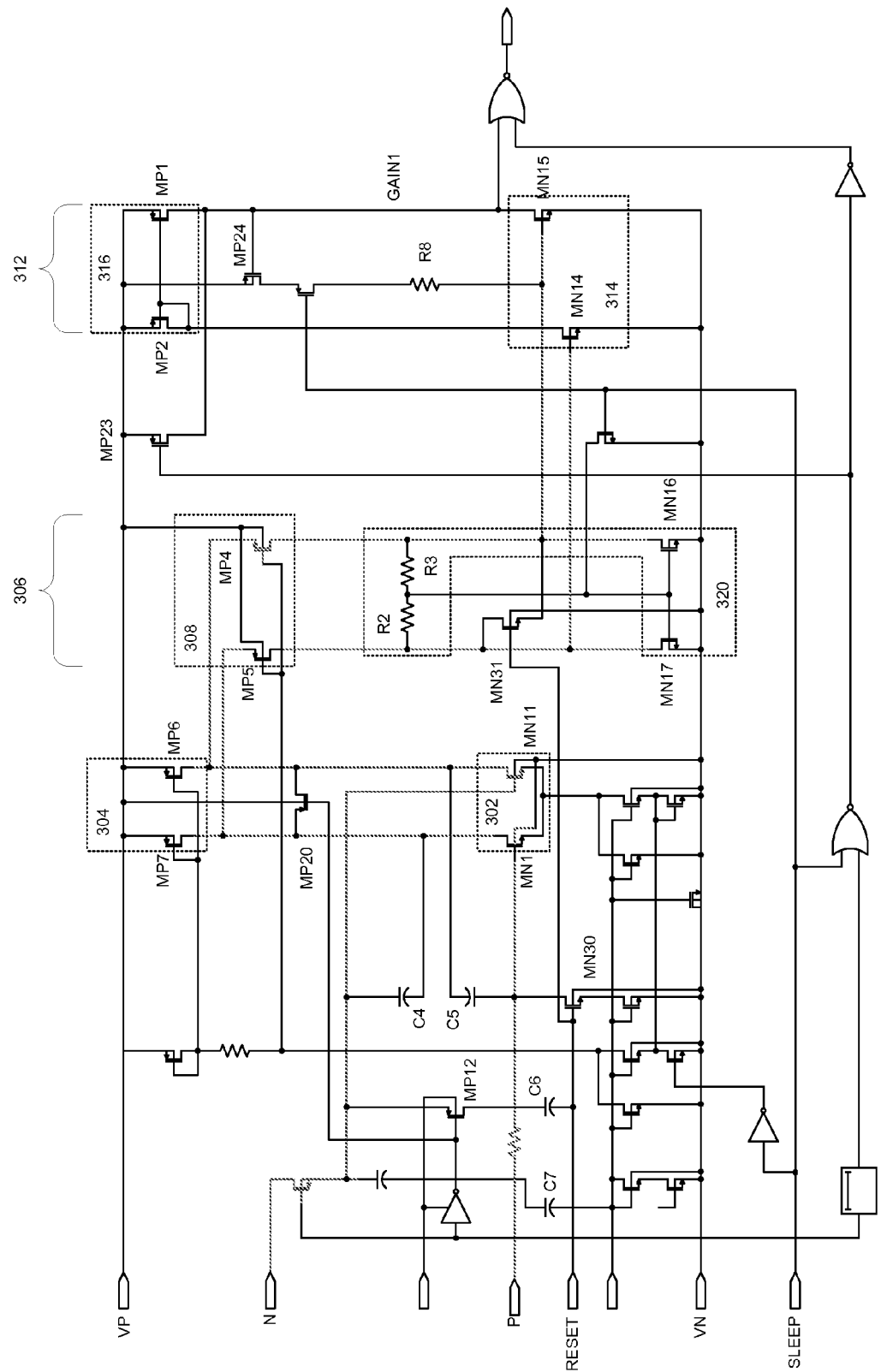
FIG. 3 is a circuit diagram of a comparator as provided by one embodiment of the present invention.

FIG. 3 shows a comparator 300 for use in switching regulators. Comparator 300 has P, N, SLEEP and RESET inputs. The basic function of comparator 300 is to monitor its P and N inputs. If the P input voltage exceeds the N input by a predetermined margin, voltage comparator 300 enters a triggered state in which its output is non-zero. Once comparator 300 enters the triggered state, changes to the P and N inputs are irrelevant. Assertion of the RESET input will however cause comparator 300 to transition from the triggered state to a reset state in which its output voltage is substantially zero. The SLEEP input, when asserted causes comparator 300 to enter a low-power sleep state.

Within comparator 300, the N and P inputs are connected to drive a differential pair 302 (NMOS devices M1 and M11). The differential pair 302 sinks the current produced by a first cascode current mirror 304 (PMOS devices MP6 and MP7). Each PMOS device in the first cascode current mirror 304 produces twice as much current as is required by the corresponding NMOS device in the differential pair 302. The remaining current is passed to a first gain stage 306 that includes a second cascode current mirror 308 (PMOS devices MP4 and MP5) and a first stage differential amplifier 320 (NMOS devices MN16 and MN17 along with resistors R2 and R3). The first stage differential amplifier 320 provides a small gain, typically on the order of 5× to 10×, and is fully differential. Importantly, the first stage differential amplifier 320 has low capacitance because the gate node between NMOS devices MN16 and MN17 is a virtual ground and experiences no voltage change during transitions. Because the second cascode current mirror 308 does not have to drive a large capacitance, the first stage differential amplifier 320 is able to respond rapidly to changes in its inputs.

The outputs of the first gain stage 306 (i.e., the outputs of the first stage differential amplifier 320) drive a second gain stage 312 that includes a second stage differential amplifier 314 (NMOS devices MN14 and MN15) and a third current mirror 316 (PMOS devices MP1 and MP2). The output of the second stage differential amplifier 314 is labeled GAIN1. A final logic stage is supplied to invert and amplify the signal and to introduce a blanking period. The blanking time is needed to avoid a glitch state that might otherwise develop during the reset transient. This is accomplished by the EDGE_DELAY block.

The purpose of comparator 300 is to be an extremely fast, asynchronous comparator with low offset. For this reason, comparator 300 includes two hysteresis devices MP24 and R8. In order to speed up the output, a large amount of hysteresis is introduced through PMOS device MP24 and resistor R8. When GAIN1 voltage drops one PMOS threshold from the upper rail, current flows in PMOS device MP24 which drive GAIN1 firmly low. Once this occurs, comparator 300 is triggered and can not be reset from the inputs, P and N. It can only be reset by the RESET signal. When the RESET occurs the hysteresis is overcome and the comparator starts in the reset mode.

When the RESET input is asserted, GAIN1 is pulled high and MN31 is turned on, resetting the first gain stage 306. The inputs P and N are skewed during reset. The N input is shorted to the P input through MP12. When the RESET ends the P node is pulled low by the precharge capacitor C6, which biases the input stage in the RESET condition at the turn-on transient. Also at the end of RESET, a current pulse into the bias circuit through C7 occurs to speed up the current detect.

A small current from MN30 lowers the voltage of the P terminal during RESET. MP20 shorts out the cascode mirrors to neutral position. MP23 holds off and resets the second gain stage 312 during RESET.

At the end of RESET, all the nodes are ready to switch. N and P inputs are driven through low impedance inputs. At high rates of voltage change on N and P, the feed forward capacitors C4 and C5 conduct current around the differential pair 302 directly into the first gain stage 306, preconditioning it to switch sooner. The faster the ramp rate, the sooner the comparator switches. The second cascode mirror 308 channels this speedup current directly to the drains of MN16 and MN17.

When the voltage at the node GAIN1 moves one PMOS threshold, the hysteresis device MP24 turns on and forces the output to switch rapidly. GAIN1 is the only slow node in the circuit, but is substantially speeded up by the hysteresis device MP24. All the other nodes in the signal path are relatively low capacitance, low impedance nodes.

There is a short delay generated by the subcircuit X15. This delay holds off the second stage for a short time to allow the transients at the end of RESET to settle before a measurement is made.

When asserted, the SLEEP input causes comparator 300 to enter a sleep mode. This powers the circuit down to about one-tenth of its working current. This allows the circuit nodes to stay close to their operating voltage without wasting current and allows the circuit to wake up quickly. The sleep mode is accomplished by reducing the ratio of the current mirrors during sleep utilizing the device MN37.

Figure 4:
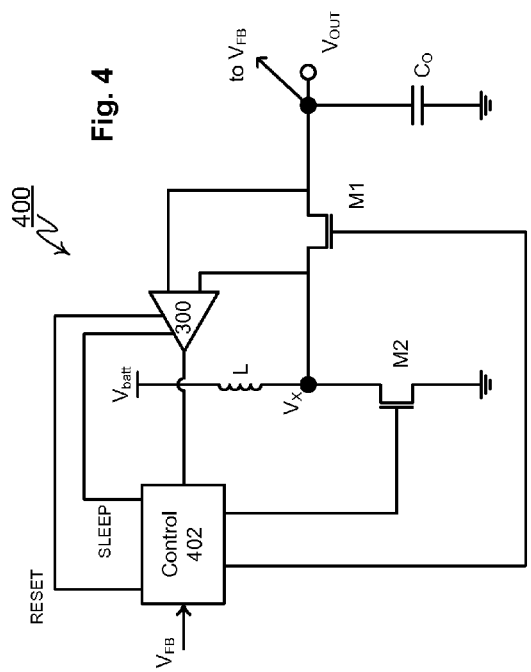
FIG. 4 is a block diagram of a boost type synchronous switching regulator configured to detect a reverse current condition using the comparator of FIG. 3.

FIG. 4 shows a boost switching regulator 400 that uses the comparator 300 to prevent reverse current flow. Regulator 400 includes an inductor L connected between an input voltage (typically a battery) and a node $V_x$. A low-side switch M2 is connected between the node $V_x$ and ground. A high-side switch M1 is connected between $V_x$ and an output node ($V_{OUT}$) of the regulator 400. A filtering capacitor connects the node $V_{OUT}$ to ground. The reverse current comparator 300 is connected to monitor the polarity over the high-side switch M1.

Regulator 400 includes a control circuit 402 to drive the high and low-side switches (M2 and M1). Control circuit 402 is configured so that switches M2 and M1 are driven out of phase—when one is on, the other is off. A break-before-make (BBM) period is inserted between activations of the high and low-side switches (M2 and M1) to prevent their simultaneous activation and the resulting shoot-through. Control circuit 402 may be implemented to operate in PWM or PFM modes or any mixture or hybrid of PWM and PFM modes. During a typical switching cycle, control circuit 402 first activates the low-side switch M2 and current flows through inductor L to ground. During this time period, as inductor L is charging, control circuit 402 wakes up comparator 300 by un-asserting the RESET signal. Control circuit 402 then activates the RESET signal to force comparator 300 to reset and enter its reset state.

Control circuit 400 then turns the low-side switch M2 off, waits for an appropriate BBM delay and turns high-side switch M1 on. Current in inductor L1 flows through high-side switch M1 to the load. During this time period, comparator 300 monitors the polarity over the high-side switch M1. As the polarity changes and indicates that current is flowing (or is about to flow) from the load through high-side switch M1, comparator 300 triggers. The output signal of the triggered comparator 300 causes control circuit 400 to turn high-side switch M1 off. Control circuit 402 then asserts the SLEEP signal to cause comparator 300 to enter its sleep or power saving mode.

This basic cycle, where switch M2 is tuned on for some period followed by switch M1 being turned on is repeated. During each repetition, comparator 300 wakes up and is reset while switch M2 is on. Comparator 300 is then ready for use when switch M1 is on. This means that comparator 300 is allowed to sleep and save power when it is not needed. It also means that the time required to wake comparator 300 and force it into its reset condition is effectively hidden—it happens in the part of the switching cycle that precedes the use of the comparator 300. This ensures that the comparator 300 is ready to use when needed without detracting from the speed of regulator 400.

Figure 5:
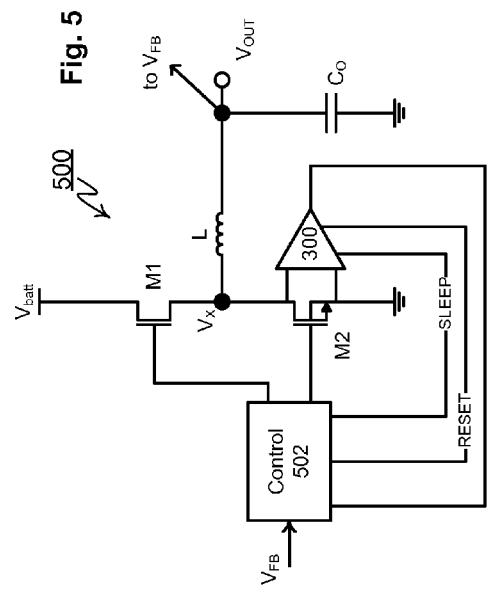
FIG. 5 is a block diagram of a buck type synchronous switching regulator configured to detect a reverse current condition using the comparator of FIG. 3.

FIG. 5 shows a buck switching regulator 500 that uses the comparator 300 to prevent reverse current flow. Regulator 500 includes a high-side switch M1 connected between an input voltage (typically a battery) and a node $V_x$. A low-side switch M2 is connected between the node $V_x$ and ground. An inductor L is connected between $V_x$ and an output node ($V_{OUT}$) of the regulator 500. A filtering capacitor connects the node $V_{OUT}$ to ground. The reverse current comparator 300 is connected to monitor the polarity over the low-side switch M2.

Regulator 500 includes a control circuit 502 to drive the high and low-side switches (M2 and M1). Control circuit 502 is configured so that switches M2 and M1 are driven out of phase—when one is on, the other is off. A break-before-make (BBM) period is inserted between activations of the high and low-side switches (M2 and M1) to prevent their simultaneous activation and the resulting shoot-through. Control circuit 502 may be implemented to operate in PWM or PFM modes or any mixture or hybrid of PWM and PFM modes. During a typical switching cycle, control circuit 502 first activates the high-side switch M1 and current flows through inductor L to the load. During this time period, as inductor L is charging, control circuit 502 wakes up comparator 300 by un-asserting the RESET signal. Control circuit 502 then drives the SLEEP signal logically low (unasserted) to cause comparator 300 to leave its sleep or power saving mode. Control circuit 502 then activates the RESET signal to force comparator 300 to reset and enter its reset state.

Control circuit 500 then turns the high-side switch M1 off, waits for an appropriate BBM delay and turns low-side switch M2 on. Current in inductor L1 flows to the load. During this time period, comparator 300 monitors the polarity over the low-side switch M2. As the polarity changes and indicates that current is flowing (or is about to flow) from the load through low-side switch M2 to ground, comparator 300 triggers. The output signal of the triggered comparator 300 causes control circuit 500 to turn low-side switch M2 off. Control circuit 502 then asserts the SLEEP signal to cause comparator 300 to enter its sleep or power saving mode.

This basic cycle, where switch M1 is tuned on for some period followed by switch M2 being turned on is repeated. During each repetition, comparator 300 wakes up and is reset while switch M1 is on. Comparator 300 is then ready for use when switch M2 is on. This means that comparator 300 is allowed to sleep and save power when it is not needed. It also means that the time required to wake comparator 300 and force it into its reset condition is effectively hidden—it happens in the part of the switching cycle that precedes the use of the comparator 300. This ensures that the comparator 300 is ready to use when needed without detracting from the speed of regulator 500.

What is claimed is:

1. A method for operating a switching regulator, the switching regulator including a first switch driven out of phase with a second switch, the method comprising:
    turning the first switch on to cause current to flow from an input node through an inductor;
    initializing a comparator to a reset state while the first switch is on;
    turning the first switch off;
    turning the second switch on to deliver current from the regulator to a load;
    turning the second switch off when the comparator enters a triggered state indicating that current may flow from the load to the regulator;
    causing the comparator to enter a low power sleep mode after the comparator enters the triggered state; and
    causing the comparator to leave the low power sleep mode after the first switch is turned on.

2. The method of claim 1 wherein the switching regulator is a boost converter.

3. The method of claim 1 wherein the switching regulator is a buck converter.

4. The method of claim 1 wherein the comparator is configured to support a triggered state and a reset state, the comparator entering the triggered state when the voltage on a positive input to the comparator exceeds the voltage on a negative input to the comparator, the hysteresis of the comparator maintaining the triggered state until a RESET input to the comparator is asserted.

5. A synchronous buck converter comprising:
a high-side switch connected between a node Vx and an input node;
a low-side switch connected between the node Vx and ground;
a comparator configured to enter a triggered state and disable the low-side switch when the polarity over the low-side switch indicates that current may flow from the node Vx to ground; and
a control circuit configured to drive the high and low side switches out of phase so that the node Vx is alternately connected to the input node and ground, the control circuit being configured to cause the comparator to transition from a low-power sleep state to a reset state when the high-side switch is on and to cause the comparator to transition from the triggered state to the low-power sleep state after the comparator has entered the triggered state.

6. A synchronous boost converter comprising:
a high-side switch connected between a node Vx and an output node;
a low-side switch connected between the node Vx and ground;
a comparator configured to enter a triggered state and disable the high-side switch when the polarity over the high-side switch indicates that current may flow from the output node to the node Vx; and
a control circuit configured to drive the high and low side switches out of phase so that the node Vx is alternately connected to the output node and ground, the control circuit being configured to cause the comparator to transition from a low-power sleep state to a reset state when the high-side switch is on and to cause the comparator to transition from the triggered state to the low-power sleep state after the comparator has entered the triggered state.

7. The synchronous buck converter of claim 5 wherein the comparator comprises a pair of input terminals connected to opposite sides of said low-side switch, respectively, and a differential stage configured to produce one or more signals that encode the difference between a voltage at one of said input terminals and a voltage at the other of said input terminals.

8. The synchronous buck converter of claim 7 wherein the differential stage encodes the difference as two currents.

9. The synchronous buck converter of claim 7 wherein the comparator further comprises one or more gain stages that amplify said encoded difference wherein at least one of said gain stages is configured so that the comparator transitions from a non-triggered state to a triggered state whenever said difference exceeds a predetermined value.

10. The synchronous buck converter of claim 9 wherein the comparator further comprises at least one hysteresis device that maintains the comparator in the triggered state until a RESET input to the comparator is asserted.

11. The synchronous buck convener of claim 10 wherein the comparator further comprises one or more feed forward capacitors arranged to conduct current around the differential stage to the one or more gain stages.

12. The synchronous boost converter of claim 6 wherein the comparator comprises a pair of input terminals connected to opposite sides of said low-side switch, respectively, and a differential stage configured to produce one or more signals that encode the difference between a voltage at one of said input terminals and a voltage at the other of said input terminals.

13. The synchronous boost converter of claim 12 wherein the differential stage encodes the difference as two currents.

14. The synchronous boost convener of claim 12 wherein the comparator further comprises one or more gain stages that amplify said encoded difference wherein at least one of said gain stages is configured so that the comparator transitions from a non-triggered state to a triggered state whenever said difference exceeds a predetermined value.

15. The synchronous boost converter of claim 14 wherein the comparator further comprises at least one hysteresis device that maintains the comparator in the triggered state until a RESET input to the comparator is asserted.

16. The synchronous buck converter of claim 15 wherein the comparator further comprises one or more feed forward capacitors arranged to conduct current around the differential stage to the one or more gain stages.

* * * * *